United States Patent [19]

Wistrom

[11] 4,430,848

[45] Feb. 14, 1984

[54] DOUBLE ACTION MANUAL CONTROL FOR WALK-BEHIND MOWER

[75] Inventor: Wayne M. Wistrom, McDonough, Ga.

[73] Assignee: McDonough Power Equipment, Division of Fuqua Industries, Inc., McDonough, Ga.

[21] Appl. No.: 305,975

[22] Filed: Sep. 28, 1981

[51] Int. Cl.³ .................................... A01D 69/10
[52] U.S. Cl. ...................... 56/11.3; 56/10.5; 56/11.8; 180/19 H
[58] Field of Search ............... 56/10.2, 10.5, 10.8, 56/11.2, 11.3, 11.8; 180/19 H; 192/0.072, 0.094

[56] References Cited

U.S. PATENT DOCUMENTS

| | | | |
|---|---|---|---|
| 4,132,280 | 1/1979 | Jones et al. | 56/11.7 |
| 4,212,141 | 7/1980 | Miyazawa et al. | 56/11.3 |
| 4,221,108 | 9/1980 | Owens | 56/11.3 |
| 4,224,996 | 9/1980 | Dobberpuhl | 180/19 H |
| 4,277,936 | 7/1981 | Hoff | 56/11.7 |
| 4,281,732 | 8/1981 | Hoch | 56/11.8 |
| 4,290,256 | 9/1981 | Seifert | 56/11.3 |

Primary Examiner—Gene Mancene
Assistant Examiner—Kris R. Schulze
Attorney, Agent, or Firm—William E. Mouzavires

[57] ABSTRACT

A walk-behind, power lawn mower having a double action manual control requiring two distinct actions in order to start the cutting blade of the mower. The control includes a bracket mounted to one side of the mower handle bar, the bracket having a slot with an enlarged opening therein. A control handle connected to a brake-clutch mechanism is mounted with one end in the bracket slot and the other end pivotally received in the other side of the handle bar. A spring acting through the brake-clutch mechanism biases the control handle in a raised position with one end registered with the enlarged opening in the bracket. To start the mower cutting blade, the control handle must be rotated against the handle bar thus releasing the brake and engaging a clutch which controls the cutting blade. However, in order to rotate the control handle, it must first be moved in one direction away from the enlarged opening in the bracket. Then the control handle may be moved in another direction to release the cutting blade.

15 Claims, 4 Drawing Figures

U.S. Patent     Feb. 14, 1984     4,430,848
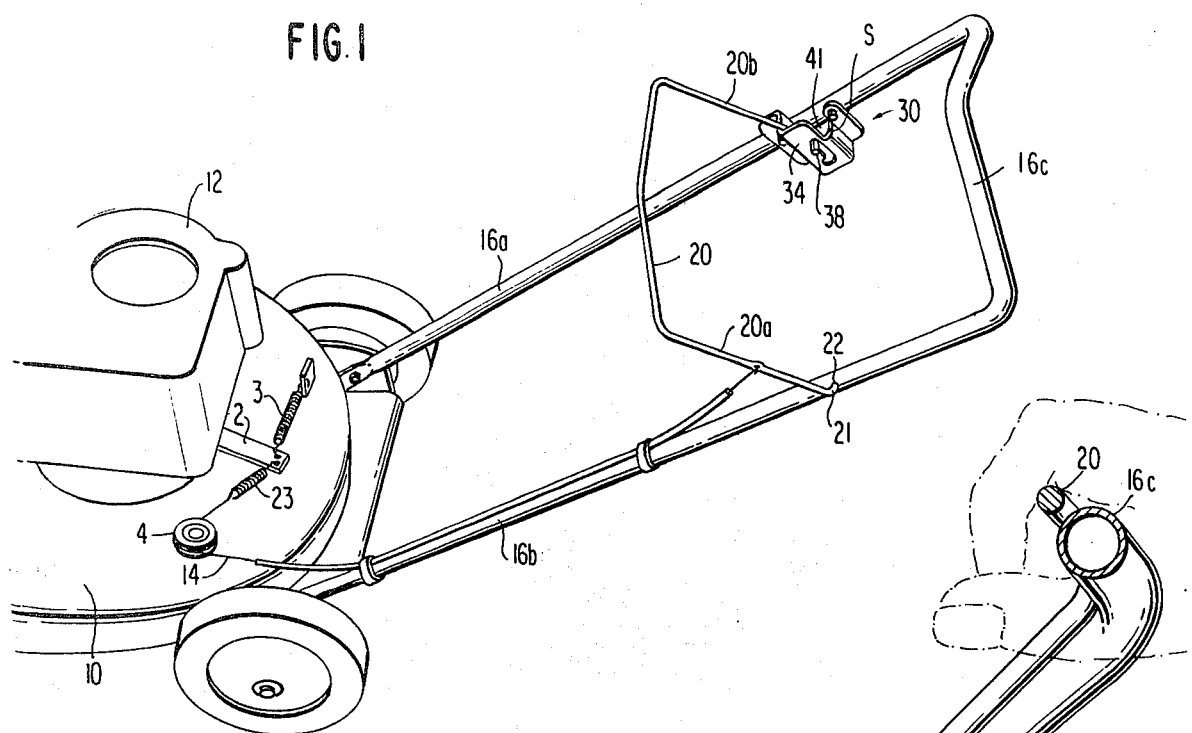
FIG. 1
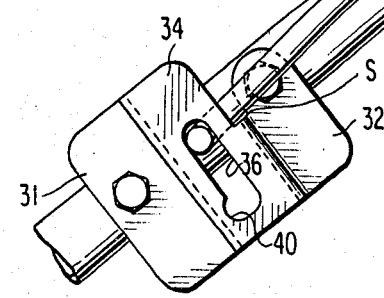
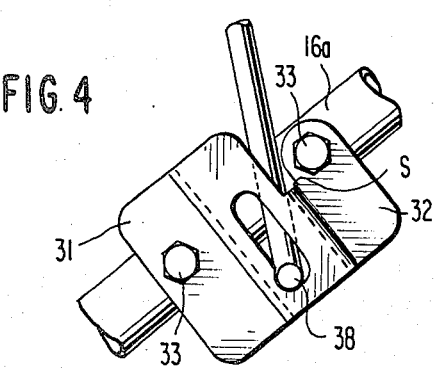
FIG. 4
FIG. 2
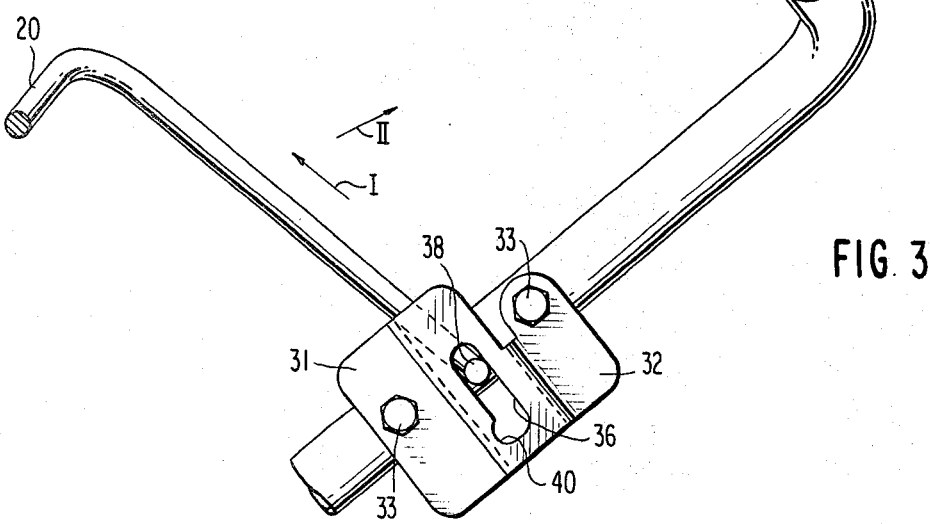
FIG. 3

DOUBLE ACTION MANUAL CONTROL FOR WALK-BEHIND MOWER

BACKGROUND OF INVENTION AND OBJECTS

Federal safety standards for lawn mowers are now in the process of being implemented in the United States. One of the standards requires that all walk-behind power lawn mowers have a manually actuated control means requiring two distinct actions to restart a stopped cutting blade. The objective of this standard is to prevent inadvertent actuation of the cutting blade.

One of the objects of the present invention is to provide a novel manual control mechanism requiring two distinct actions in order to release the cutting blade for operation even after the mower engine has been energized. Included herein is the provision of such a control mechanism that is simple but durable in construction, effective in operation and yet may be economically manufactured and easily installed on new or existing power mowers. In addition, the control mechanism may be mounted to the existing handle bar structure of new or existing lawn mowers.

A further object of the present invention is the provision of such a control mechanism that may be easily handled during operation of the mower to maintain the mower cutting blade in operation and yet will automatically be moved to stop the cutting blade when the operator releases his hands from the handle bars of the mower.

A further object of the present invention is to provide a power lawn mower incorporating a novel control mechanism which will achieve the above objects.

SUMMARY OF INVENTION

In summary, the preferred embodiment of the invention includes a control handle having one side that is pivotally mounted to one side of the handle bars of the mower. The other side of the control handle is received through an elongated slot formed in a bracket which is fixed to the other side of the handle bars of the mower. The slot has an enlarged opening which normally receives or registers with the end of the adjacent control. A spring mechanism biases the control handle in the aforementioned position wherein the control handle is out of the plane of the handle bars of the mower. The control handle is connected to a brake-clutch mechanism for operating the same to either release the clutch and apply the brake relative to the cutting blade or to engage the clutch and release the brake. When the control handle is in its normal raised position described above, the brake-clutch mechanism will be in the mode where the brake is applied relative to the cutting blade so that the blade will be stopped.

In order to release the brake and engage the clutch to permit the cutting blade to operate, it is necessary to pivot the control handle to depress it against the handle bars of the mower. However, in order to achieve the latter pivotal movement, the control handle must first be moved upward with a separate action to raise it from the bottom of the slot for otherwise, the control handle would engage a stop surface on the bracket which would prevent pivotal movement of the handle. For added insurance against rotation of the control handle without first raising it in a separate action, the enlarged opening is provided in the bottom of the slot to receive the lower end of the control handle to prevent rotation of the latter. Once the control handle is raised from registry with the enlarged opening, and to clear the stop surface on the bracket, it may then be pivoted against or in the plane of the handle bars to release the brake and engage the clutch for permitting the cutting blade to operate. During operation of the mower, the control handle is held by the operator in the depressed condition as the operator holds the handle bars. Should the operator release his hands from the handle bars, the spring mechanism will automatically return the control handle to its raised position, thus actuating the brake-clutch mechanism to stop the cutting blade even though the engine of the mower is still operating.

DRAWINGS

Other objects and advantages of the present invention will become apparent from the following more detailed description taken in conjunction with the attached drawing in which:

FIG. 1 is a perspective view of a walk-behind lawn mower embodying the control mechanism of the present invention;

FIG. 2 is a side elevational view to an enlarged scale of the control mechanism shown in a mode where it releases a brake and engages a clutch to permit the mower blade to be operated;

FIG. 3 is a view similar to FIG. 2 except that the control mechanism is in an intermediate position which must be achieved before the cutting blade may be operated; and FIG. 4 is a view generally similar to FIG. 3 but showing the control mechanism in the position where the mower blade is stopped.

DETAILED DESCRIPTION

Referring now to the drawings in detail, FIG. 1 discloses for illustrative purposes only, a walk-behind power lawn mower incorporating a control mechanism embodying the present invention. The mower typically includes a blade housing 10 having a rotary cutting blade which operates in a horizontal plane within the blade housing 10 under a drive that is provided by a conventional engine or motor generally designated 12. The lawn mower is handled through means of conventional handle bars including opposite side portions 16a and 16b joined by a rear cross portion 16c.

Rotation of the cutting blade is controlled by any conventional brake-clutch mechanism which either will apply a brake and release a clutch relative to the drive shaft of the cutting blade to stop the same, or will release the brake and engage the clutch to release the cutting blade for operation. As shown in FIG. 1, the brake-clutch mechanism is biased to a first position (wherein the brake is engaged and the clutch is released for stopping the cutting blade) by means of a tension coil spring 3 having one end anchored to the blade housing and another end connected to an actuating lever 2. The brake-clutch mechanism is actuated to a second position for operating the cutting blade by means of a connecting member shown as a cable 14 which is reciprocated by means including a double-action control mechanism embodying the present invention. At its lower end, connecting cable 14 is trained about a pulley 4 and connected to lever 2 through a coil spring 23.

In the preferred embodiment of the invention shown, the control mechanism includes a control handle including opposite generally parallel side portions 20a and 20b joined by a cross portion 20 to form a generally U-shaped bail structure. The control handle may be formed from a steel rod or any other suitable material or stock. One side portion 20a of the control handle has an inwardly projecting end 21 which is received in an aperture 22 formed in the adjacent handle bar portion 16b to thus pivotally mount the control handle relative to the latter. The other side 20b of the control handle includes an inwardly projecting end portion 38 which extends normal to the side portion 20b and through an elongated slot 36 formed in a bracket generally designated 30.

Bracket 30 includes a pair of mounting flange 31, 32 respectively fixed in any suitable manner such as by means of the fasteners 33 extending through the handle bar portion 16a.

Bracket 30 further includes a mounting portion 34 offset inwardly from mounting flanges 31, 32 in a plane generally parallel thereto. Mounting portion 34 contains the elongated slot 36 described above which extends vertically within the mounting portion 34 and has, in its lower ends, an enlarged opening 40. Side portion 20b of the control bar extends in the space between bracket mounting portion 34 and handle bar portion 16a with the end 38 projecting through the elongated slot 36. Side portion 20b of the control handle is thus free to slide along slot 36, it being understood that the mounting of the opposite side portion 20a in handle bar portion 16b is effected to permit such movement. Additionally, control handle 20 is free to pivot downwardly against handle bar portion 16c as long as the end 38 is not registered with a stop surface S and the enlarged opening 40 in the bracket slot 36. Bracket 30 further contains, in one wall portion thereof, an opening 41 permitting the side portion 20b of the control handle to be pivoted downwardly relative to the handle bars as just described, as long as portion 20b has been sufficiently raised to clear stop surface S. Opening 40 also is defined in part by stop surface S formed by the portion of the bracket which interconnects the mounting portion 34 and mounting flange 32 of the bracket.

In the normal position of the control handle, that is, when it is released by the operator of the mower, the control handle is in a raised position (see FIGS. 1, 4) relative to the plane of the handle bars 16a, 16b and 16c. In this position, in the shown embodiment, the control bar extends generally normal to the plane of the handle bars and the side portion 20b is positioned by gravity in the lower end of slot 36 in registry with enlarged opening 40. This position of the control handle is achieved through a biasing mechanism which, in the preferred embodiment shown, includes the coil tension spring 3 described above.

In the preferred embodiment, connecting cable 14 is connected by any suitable means to the side portion 20b of the control handle. Additionally, cable 14 is mounted along handle bar portion 16a in any suitable manner. When the control handle is in its normal or raised position shown in FIG. 1, the brake-clutch mechanism will be in the mode wherein the brake is engaged and the clutch is released, thus preventing rotation of the cutting blade even when the engine 12 is operating.

In order to activate the cutting blade after the engine 12 is energized, it is necessary to depress the control handle portion 20 against the handle bar portion 16c by pivoting the control handle relative to the handle bars. However, should the operator attempt to pivot the control handle directly from the position shown in FIG. 4 to the position shown in FIG. 2, the inwardly projecting portion 38 of the control handle will enter into the enlarged opening 40 of the bracket slot 36 to prevent such movement. It is therefore necessary for the operator to first raise the one side 20b of the control handle in the slot 36 to elevate the portion 38 above the enlarged opening 40 as shown in FIG. 3. Also the side 20b must clear the stop surface S which would otherwise prevent rotation of the control handle. Subsequently, the operator may then pivot with a separate action, the control bar 20 against the handle bar portion 16c which will cause the connecting rod 14 to be advanced forwardly, thus releasing the brake and engaging the clutch to permit rotation of the cutting blade. As noted above, the opening 41 in the bracket 30 will permit the side portion 20b of the control bar to be moved downwardly into the operative position.

It will be seen from FIG. 2 that when the control bar is in the operative position, its cross portion 20 will engage against the cross portion 16c of the handle bars so that the operator may easily grasp both the control handle portion 20 and the handle bar portion 16c while he is manipulating the mower. In addition, during this condition, the spring 3 will be in a tensioned state. Should, however, the operator release his hands from the control handle, the spring 3 will cause the control handle to pivot out of the plane of the handle bars and into the position shown in FIG. 4 where the brake-clutch mechanism will be operated to engage the brake and release the clutch, thus immediately stopping the cutting blade. In this position, the inwardly projecting portion 38 of the control handle will return by gravity to the bottom of slot 36 adjacent the enlarged opening 40 in the bracket slot 36 to thus prevent movement of the control bar to the operative position unless two distinct motions are applied thereto in the manner set forth above.

The present invention may also be embodied in a bracket such as 30 described above but without utilizing the enlarged opening 40 in the bottom of the bracket slot 36. However, in this instance, the slot 36 would have to be longer than that shown and described above, and this would necessitate a larger bracket. Therefore, for purposes of economy and added insurance against unwanted actuation of the cutting blade, the bracket shown and described herein is preferred.

It will thus be seen that the present invention provides a novel control mechanism which will comply with Federal safety standards in an effective manner without significantly encumbering the lawn mower from the standpoint of operation, construction, and cost.

What is claimed is:

1. In a power-driven lawn mower having a cutting blade, a brake-clutch mechanism for controlling operation of the cutting blade, handle bars for manipulating the mower from behind; a control mechanism for operating the brake-clutch mechanism including a control handle having opposite sides and being operatively connected to said brake-clutch mechanism to operate the same, one side being pivotally mounted to an adjacent first position of the handle bars, a bracket fixed to another portion of the handle bars opposite said first portion, a slot in said bracket having an enlarged opening therein, the other side of said control handle having a portion mounted in said slot for pivotal movement as well as for movement along the slot, said bracket having a stop surface located above the enlarged opening in the slot, means biasing said control handle to a normal position wherein said brake-clutch mechanism is engaged to prevent actuation of the cutting blade and wherein said portion of said other side of the control handle is registered with the opening in the slot such that pivotal movement of said control handle is prevented by engagement with said stop surface and by receipt of said one portion of said other side of the control handle in said opening, said control handle being pivotally movable out of the normal position and into a depressed position against the handle bars but only after said portion of said other side of the control handle is first moved along the slot out of registry with said opening, movement of said control handle to said depressed position causing actuation of said brake-clutch mechanism to release the cutting blade for operation.

2. The lawn mower defined in claim 1 wherein said other side of said control handle is biased by gravity downwardly in said slot to a position wherein said portion thereof is in registry with the enlarged opening in said slot.

3. The lawn mower defined in claim 2 wherein said slot extends in a general vertical direction and the opening is at the bottom end of the slot.

4. The lawn mower defined in claim 1 wherein said means biasing said control handle includes a spring.

5. The lawn mower defined in claim 4 wherein said spring biases said control member via the brake-clutch mechanism.

6. The lawn mower defined in claim 2 wherein said means biasing said control member includes a spring connected to the brake-clutch mechanism and biasing the latter to a position preventing operation of the cutting blade.

7. The lawn mower defined in claim 6 further including a connecting member interconnecting said other side of said control member and the brake-clutch mechanism.

8. The lawn mower defined in claim 1 wherein said bracket has a mounting portion offset from an adjacent portion of the handle bars leaving a space receiving the other side of said control handle, said stop surface defining a portion of said space.

9. The lawn mower defined in claim 1 wherein said control handle includes a cross portion interconnecting the opposite sides of said control handle and engages the handle bars when the control handle is in the depressed position.

10. A dead-man control mechanism for a walk-behind power driven lawn mower comprising a generally U-shaped control handle including opposite sides adapted to be pivotally mounted to opposite sides of handle bars of an associated mower, a bracket adapted to be fixed to one of the sides of the handle bars, said bracket having an elongated slot for receiving an end portion of one of said sides of the control handle, said slot having an enlarged opening for receiving said end portion to prevent pivotal movement of said control handle relative to the bracket, said end portion being movable along said slot away from registry with the enlarged opening therein to permit pivotal movement of said control handle relative to the bracket, said bracket having a stop surface above the enlarged opening in the slot for engaging one of the sides of the control handle, and a connecting member connected at one end portion to one of the sides of the control handle and having an opposite end portion adapted to be connected to a brake mechanism which controls operation of a cutting blade of the associated mower.

11. The mechanism defined in claim 10 wherein said bracket has a mounting portion containing said slot, a flange portion for attaching said bracket to the handle bars of the mower, and a portion interconnecting said mounting and flange portions and including said stop surface.

12. In a power-driven lawn mower having a cutting blade, a brake-clutch mechanism for controlling operation of the cutting blade, handle bars for manipulating the mower from behind; a control mechanism for operating the brake-clutch mechanism including a control handle having opposite sides and being operatively connected to said brake-clutch mechanism to operate the same, one side being pivotally mounted to an adjacent first position of the handle bars, a bracket fixed to another portion of the handle bars opposite said first portion, a slot in said bracket extending vertically therein and having a bottom portion, the other side of said control handle having a portion mounted in said slot for pivotal movement as well as for movement along the slot, a stop surface located above the bottom portion of the slot, means biasing said control handle to a normal position wherein said brake-clutch mechanism is engaged to prevent actuation of the cutting blade and wherein said portion of said other side of the control handle is located in the bottom portion of the slot such that pivotal movement of said control handle is prevented by engagement of said one portion of said other side of the control handle with said stop surface, said control handle being pivotally movable out of the normal position and into a depressed position against the handle bars but only after said portion of said other side of the control handle is first moved along the slot out of the bottom portion thereof, movement of said control handle to said depressed position causing actuation of said brake-clutch mechanism to release the cutting blade for operation.

13. A dead-man control mechanism for a walk-behind power driven lawn mower comprising a generally U-shaped control handle including opposite sides adapted to be pivotally mounted to opposite sides of handle bars of an associated mower, a bracket adapted to be fixed to one of the sides of the handle bars, said bracket having an elongated slot for receiving an end portion of one of said sides of the control handle, said bracket having a stop surface for preventing pivotal movement of said control handle relative to the bracket, said end portion being movable along said slot to clear said stop surface to permit pivotal movement of said control handle relative to the bracket, and a connecting member connected at one end portion to one of the sides of the control handle and having an opposite end portion adapted to be connected to a brake mechanism which controls operation of a cutting blade of the associated mower.

14. The mechanism defined in claim 13 wherein said slot extends vertically in the bracket and has a bottom portion for receiving one of the sides of the control handle, said bottom of the slot being located below said stop surface.

15. The mechanism defined in claim 14 wherein said bracket has a mounting portion containing said slot, a flange portion for attaching said bracket to the handle bars of the mower, and a portion interconnecting said mounting and flange portions and including said stop surface.

* * * * *